United States Patent [19]
Sopory

[11] 4,400,614
[45] Aug. 23, 1983

[54] PTC DEVICES AND THEIR PREPARATION

[75] Inventor: Umesh K. Sopory, San Jose, Calif.

[73] Assignee: Raychem Corporation, Menlo Park, Calif.

[21] Appl. No.: 322,647

[22] Filed: Nov. 18, 1981

Related U.S. Application Data

[62] Division of Ser. No. 150,910, May 19, 1980, Pat. No. 4,334,351.

[51] Int. Cl.$^3$ ............................................. H05B 3/34
[52] U.S. Cl. ..................................... 219/528; 29/611;
219/544; 219/549; 219/553; 264/105; 338/22 R
[58] Field of Search .................. 29/611, 621; 219/504,
219/505, 528, 544, 548, 549, 553; 338/20, 22 R,
22 SD, 212, 214; 264/105, 346; 252/511;
428/214; 174/110 PM

[56] References Cited
U.S. PATENT DOCUMENTS 3,435,401  3/1969  Epstein ................................. 328/214
3,793,716  2/1974  Smith-Johannsen ................. 219/548
3,914,363  10/1975  Bedard et al. ....................... 264/105
4,277,673  7/1981  Kelly ..................................... 219/528
4,286,376  9/1981  Smith-Johannsen et al. ........ 29/611

Primary Examiner—Volodymyr Y. Mayewsky
Attorney, Agent, or Firm—Lyon & Lyon

[57] ABSTRACT

The flex life of devices comprising a relatively inflexible PTC conductive polymer element is improved by surrounding the PTC element with a layer of a relatively flexible polymeric composition which is melt-fused thereto. Particularly useful devices are self-limiting strip heaters in which the polymeric component of the PTC element comprises a mixture of two crystalline polymers having substantially different melting points, the higher melting polymer having a melting point of at least 160° C., preferably at least 200° C., for example a mixture of polyvinylidene fluoride and a copolymer of ethylene and tetrafluoroethylene. Such devices can be made by melt-extruding a layer of the relatively flexible polymeric composition around the PTC element, and heating to cause melt-fusion of the polymers at the interface of the layer and the PTC element.

14 Claims, 2 Drawing Figures

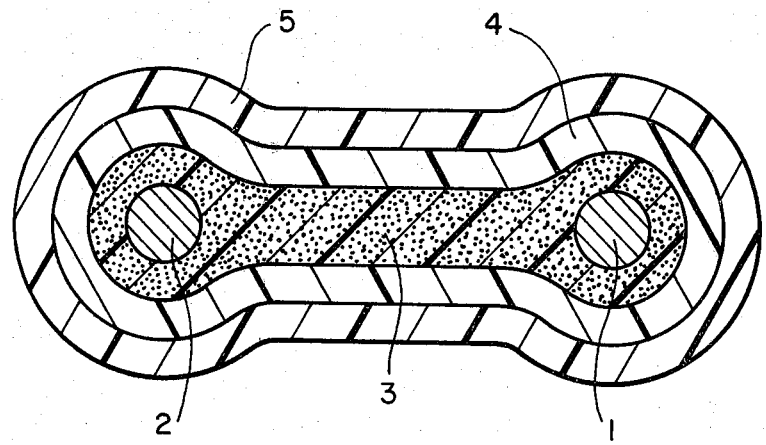
FIG_1
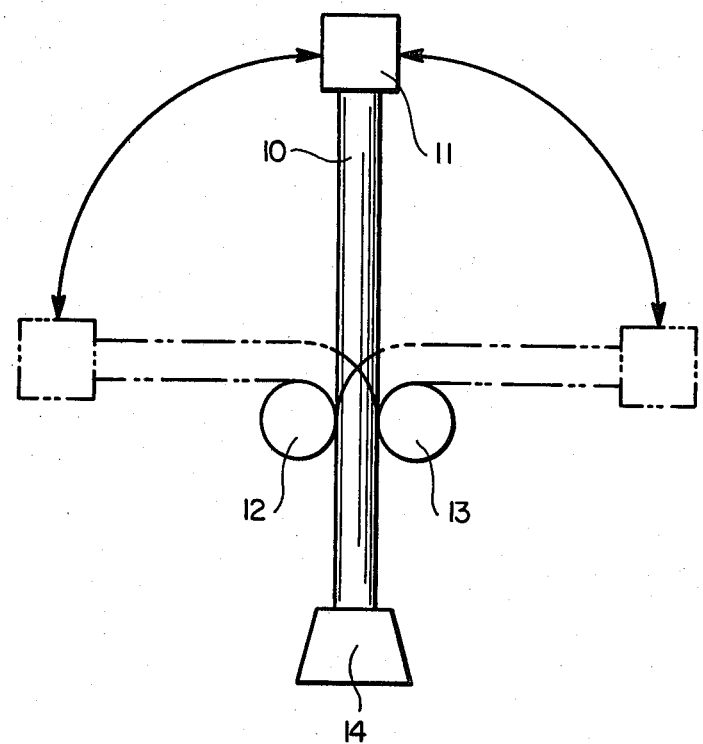
FIG_2

PTC DEVICES AND THEIR PREPARATION

CROSS REFERENCE TO RELATED APPLICATION

This application is a divisional of my application Ser. No. 150,910, filed May 19, 1980, now U.S. Pat. No. 4,334,351.

BACKGROUND OF THE INVENTION

1. Field of the Invention

This invention relates to electrical devices containing conductive polymer PTC elements, in particular self-limiting strip heaters, and their preparation.

2. Summary of the Prior Art

Self-limiting strip heaters are well-known. They comprise an element of a PTC conductive polymer having parallel electrodes embedded therein and an outer jacket of one or more layers of an insulating polymer surrounding the PTC element. Other electrical devices comprising a PTC element, one or more electrodes and an encapsulating jacket of an insulating polymer are also known. In the preparation of such devices, the device is often subjected to an annealing step in which it is heated to a temperature above the melting point of the PTC element in order to reduce the resistivity of the PTC composition. Reference may be made for example to U.S. Pat. Nos. 3,793,716; 3,823,217 (Kampe); 3,861,029 (Smith-Johannsen et al.); 3,914,363 (Bedard et al.) and 4,177,376 (Horsma et al.) and to commonly assigned U.S. patent applications Ser. Nos. 84,352 (Horsma et al.); 88,344 (Lutz) now abandoned and the CIP thereof Ser. No. 134,354; 732,792 (Van Konynenburg et al.), now abandoned; 751,095 (Toy et al.), now abandoned; 798,154 (Horsma), now abandoned; 965,343 (Van Konynenburg et al.), now U.S. Pat. No. 4,237,441; 965,344 (Middleman et al.), now U.S. Pat. No. 4,238,812; 965,345 (Middleman et al.), now abandoned; and 75,413 (Van Konynenburg); and the eight applications filed Apr. 21, 1980 by Gotcher et al. Ser. No. 141,984; Middleman et al. Ser. No. 141,987; Fouts et al. Ser. No. 141,988; Evans Ser. No. 141,989; Walty Ser. No. 141,990; Fouts et al. Ser. No. 141,991; Middleman et al. Ser. No. 142,053 and Middleman et al. Ser. No. 142,054. The disclosure of each of these patents and applications is incorporated herein by reference.

SUMMARY OF THE INVENTION

It is often important that such devices, in particular strip heaters, should not be damaged by flexing. In the further development of such devices it has been found desirable to make use of PTC conductive polymer compositions which are relatively inflexible (i.e. have low elongations and/or are prone to cracking or other forms of damage in flex tests which are used to determine whether the devices will perform satisfactorily under service conditions). I have found that by surrounding a PTC conductive polymer element by a layer of a second polymeric composition having a substantially greater flexibility and by heating the device so that there is melt fusion of polymers at the interface between the layer and the PTC element, a device having improved resistance to damage by flexing is obtained.

In one aspect the invention provides a flexible electrical device which comprises (a) an elongate flexible PTC element composed of a PTC conductive polymer composition which exhibits PTC behavior and which comprises
  (i) a polymer component, and
  (ii) a particulate filler component which has been dispersed in said polymer component and which comprises a conductive filler;
(b) at least one electrode, preferably two electrodes which can be connected to a source of electrical power and which when so connected cause current to flow through said PTC element; and
(c) surrounding said PTC element and melt-fused thereto, a layer of a second polymeric composition having substantially greater flexibility at 23° C. than said PTC composition.

In another aspect the invention provides a method of making such a device which comprises (1) forming said PTC element by melt-shaping said conductive polymer composition adjacent said electrode preferably adjacent a pair of electrodes so that the electrodes are in electrical contact with said PTC element;
(2) forming on the surface of said PTC element a layer of a second polymeric composition having substantially greater flexibility at 23° C. than said PTC composition; and
(3) heating said layer to cause melt fusion of said second polymeric composition and said PTC composition at the interface between said layer and said PTC element.

BRIEF DESCRIPTION OF THE DRAWING

The invention is illustrated in the accompanying drawing in which

FIG. 1 is a cross-section through a flexible self-limiting strip heater of the invention, and FIG. 2 illustrates a method for testing the flexural behavior of a device.

DETAILED DESCRIPTION OF THE INVENTION

The PTC conductive polymer composition used in the present invention may be of any kind, including those disclosed in the prior art, provided that melt fusion thereof to the second polymeric composition can take place. Thus the PTC composition is preferably one that can be melt-shaped, e.g. by extrusion, and is preferably substantially free from cross-linking when the melt-fusion takes place. Once the melt-fusion has taken place, the PTC composition can if desired be cross-linked, e.g. by irradiation. The invention is of particular value when the PTC composition is one which is relatively rigid (i.e. which has low elongation and/or performs poorly in a flex test of the kind described below). Such rigidity can result from the amounts and characterisics of the polymer or mixture of polymers and/or the conductive filler (which will often consist of or contain one or more carbon blacks) and/or non-conductive filler(s), selected for the desired electrical and other characteristics of the PTC composition. I have found this invention to be particularly useful when the PTC composition is as described and claimed in the International (PTC) application No. 8,000,592 entitled "PTC compositions" filed contemporaneously herewith by the assignee of this application, Raychem Corporation; the disclosure of that International Application is incorporated herein by reference. In those compositions, the polymer component comprises a mixture of a first crystalline polymer having a first melting $T_1$ and a second crystalline polymer having a second melting point $T_2$ which is at least $(T_1+25)°$ C., preferably at least $(T_1+70)°$ C.; the polymer component can also contain other polymers, e.g. elastomers. The mixture of crystalline polymers need not be a physical mixture of two distinct polymers but may be a single polymer, e.g. a block copolymer, having distinct segments such that the polymer has two distinct melting points. The melting points referred to are the peak values of the peaks of a DSC (differential scanning calorimeter) curve. $T_2$ is preferably at least 160° C., especially at least 200° C., when it is desired that the composition is stable on exposure to high temperatures. $T_1$ is selected for the desired switching temperature $(T_s)$ of the composition, and may be for example 100° to 175° C. One or both of the polymers may be a fluorinated polymer, for example the lower melting polymer may be polyvinylidene fluoride and the melting polymer an ethylene/tetrafluoroethylene polymer.

The second polymeric composition which is applied as a layer around the PTC conductive polymer element and melt-fused thereto should have greater flexibility than the PTC conductive polymer composition at room temperature (25° C.), preferably at all temperatures between 0° and the higher of 100° C. and the $T_s$ of the PTC composition, especially between $-20°$ C. and the higher of 100° C. and the $T_s$ of the PTC composition. The second polymeric composition and the thickness of the layer thereof should be such that it substantially enhances the flex life of the device in a flex test of the kind described below, and in its broadest sense the term "having greater flexibility" should be construed accordingly. Normally the layer will be of uniform composition, but the invention includes for example a first layer composed of a hot melt adhesive which is melt-bonded on one surface to the PTC element and on the other surface to a layer of another polymeric composition. In a modification of the invention a layer of a second, more flexible, polymeric composition is bonded to the PTC element by means of another form of adhesive, in which case the heating step is omitted or replaced by another step to activate the adhesive.

The second polymeric composition is often an electrical insulator and is preferably substantially free of (i.e. contains 0 to 10% by weight of) fillers and other additives. The second polymeric composition should be compatible with the PTC composition to ensure melt-fusion, and preferably the second polymeric composition comprises at least 50% by weight of units which are the same as units constituting at least 50% by weight of the polymer providing the continuous phase in the PTC element. Preferably the second polymeric composition contains at least 90% by weight of the polymer providing the continuous phase of the PTC element.

The layer of the second polymeric composition is preferably melt-extruded around the PTC element, e.g. using a cross-head die. Thus in a preferred procedure, the PTC composition is melt-extruded around two (or more) electrodes, e.g. to provide the core for a self-limiting strip heater, and the layer of the second polymeric composition is applied thereto by simultaneous or subsequent melt extrusion, e.g. by coextrusion. The layer of the second polymeric composition need not be applied in a separate operation and the invention includes for example formation of the layer by appropriate adjustment of the extrusion conditions so that the PTC element is of non-uniform composition, with the outer layer having the desired characteristics.

When, as is preferred, the layer of the second polymeric composition is applied separately in a melt-extrusion operation, the extrusion conditions can be adjusted so that melt-fusion takes place essentially simultaneously with the extrusion, so that no separate heating step is required. In many cases, however, a separate heating step is more conveniently carried out. Especially is this so when it is desired to anneal the PTC composition to reduce its resistivity, in which case the annealing step is preferably carried out under conditions such that the desired melt-fusion is effected at the same time. When using a PTC composition as described above which comprises two crystalline polymers, annealing is preferably carried out at $(T_1+5)°$ C. to $(T_2-10)°$ C. for a time sufficient to reduce the resistivity at 25° C. of the PTC composition from a first value, $o$, prior to said annealing, to a second value, $e_A$, which is less than $0.8 \times e_0$, preferably less than $0.6 \times e_0$, with $e_A$ preferably being from $10^2$ to $10^5$ ohm.cm. Annealing in this way is described and claimed in my copending commonly assigned application Ser. No. 150,911 entitled "Improved method for annealing PTC compositions" filed contemporaneously herewith, the disclosure of which is incorporated herein by reference.

Referring now to FIG. 1 of the drawings, wire electrodes 1 and 2 are embedded in PTC element 3, which is surrounded by, and melt-fused at the interface to, a layer of an insulating polymeric composition 3, which is itself surrounded by a further layer of another insulating composition 5. Referring now to FIG. 2, strip heater 10 is secured at its upper end to a holder 11, and a weight of 1 lb. is secured to its lower end. The strip heater passes between and just contacts two fixed mandrels 12 and 13, each of 0.5 inch diameter. To determine the behavior of the strip heater on flexing, the holder is moved in the arc of a circle first to one side and then to the other, as shown by the dotted lines, at a rate of 40 cycles per minute. The number of cycles required to initiate and to complete breaking are determined.

The invention is illustrated by the following Example.

EXAMPLE

The ingredients used in this Example are given in the Table below.

The ingredients for Composition A were dry-blended, and the blend fed to a Werner Pfleiderer ZSK co-rotating twin screw extruder heated to about 260° C. and fitted with a pelletizing die. The extrudate was chopped into pellets.

The ingredients for Composition B were dry-blended and the blend fed to a Werner-Pfleiderer ZSK extruder heated to 315°–345° C. and fitted with a pelletizing die. The extrudate was chopped into pellets.

Two parts by weight of the pellets of Composition B and one part by weight of the pellets of composition A were dry-blended together and then dried in air for about 16 hours at about 150° C. The dried blend was melt-extruded at 315°–340° C. through a single screw extruder fitted with a cross-head die around two preheated 18 AWG stranded nickel-coated copper wires whose centers are about 0.29 inch apart, to produce an extrudate having a cross-section of dumbbell shape as shown in FIG. 1, the distance between the closest points of the electrodes being about 0.235 inch the thickness of the central section (t) being about 0.030 inch and the thickness of the end sections (d) being about 0.070 inch. After the extrudate had cooled, two jackets were extruded around it, the inner jacket being 0.02 inch thick and composed of polyvinylidene fluoride having a melting point of about 156° C. (Kynar 460 from Pennwalt) and the outer being 0.025 inch thick and composed of a fluorinated ethylene/propylene copolymer having a melting point of about 247° C. (Teflon FEP 100 from du Pont). The jacketed strip was annealed at 175° C. in air for 4 to 9 hours. The product had a cross-section as shown in FIG. 1.

In another test which can be used to determine whether a strip heater has satisfactory flexibility, a length of the heater is held at one end in a fixed holder and at the other end by a rotatable holder which can be rotated through 180°. The distance between the holders is fixed, usually at a value of 1 to 4 inch, e.g. 1.25 or 3.375 inch, and the heater is under a known tension, usually of 0.2 to 1 lb. e.g. 0.46 lb. The rotatable holder is rotated clockwise and anti-clockwise through 180° at a fixed rate, e.g. 15 cycles/minute. At intervals the PTC element is inspected to see whether it has cracked.

TABLE

|  | Comp. A | | Comp. B | | Final Mix | |
| --- | --- | --- | --- | --- | --- | --- |
|  | Wt % | Vol % | Wt % | Vol % | Wt % | Vol % |
| Polyvinylidene Fluoride having a melting point of about 160° C. (Knyar 451 from Pennwalt) | 88.0 | 89.2 |  |  | 29.3 | 32.0 |
| $CaCO_3$ (Omya Bsh from Omya Inc.) | 3.0 | 2.0 |  |  | 1.0 | 0.7 |
| Carbon Black (Vulcan XC-72 from Cabot, particle size 300 Angstroms, surface area 254 $m^2/g$) | 9.0 | 8.8 |  |  | 3.0 | 3.2 |
| Ethylene/tetrafluroethylene copolymer having a melting point of about 270° C. (Tefzel 2010) |  |  | 64.6 | 75.5 | 43.1 | 48.4 |
| Carbon Black (Continex HAF from Continental Carbon, particle size 290 Angstroms, surface area 80 $m^2/g$) |  |  | 15.0 | 16.5 | 10.0 | 10.6 |
| ZnO (Kadox 515 from Gulf and Western) |  |  | 20.0 | 7.2 | 13.3 | 4.5 |
| Processing aid |  |  | 0.4 | 0.8 | 0.3 | 0.6 |

I claim:

1. A flexible electrical device which comprises
  (a) an elongate flexible PTC element composed of a PTC conductive polymer composition which exhibits PTC behavior and which comprises
    (i) a polymer component which comprises a mixture of a first crystalline polymer having a first melting point $T_1$ and a second melting point $T_2$ which is at least $(T_1+25)°$ C.; and
    (ii) a particulate filler component which has been dispersed in said polymer component and which comprises a conductive filler;
  (b) two elongate metal electrodes which are electrically connected to the PTC element so that, when the electrodes are connected to a source of electrical power, current flows through said PTC element; and
  (c) surrounding said PTC element and melt-fused thereto, a layer of a second polymeric composition having substantially greater flexibility at 23° C. than said PTC composition.

2. A device according to claim 1 wherein said electrodes are surrounded by and in physical contact with said PTC element.

3. A device according to claim 1 wherein $T_2$ is at least $(T_1+70)°$ C.

4. A device according to claim 1 wherein the second polymeric composition has a melting point of $(T_1-10)°$ C. to $(T_1+50)°$ C.

5. A device according to claim 1 wherein the second polymeric composition comprises said first crystalline polymer.

6. A device according to claim 5 wherein the second polymeric composition consists essentially of said first crystalline polymer.

7. A device according to claim 1 wherein said PTC composition has a resistivity of $10^2$ to $10^5$ ohm.cm.

8. A device according to claim 1 wherein $T_2$ is at least 160° C.

9. A device according to claim 8 wherein $T_2$ is at least 200° C.

10. A device according to claim 9 wherein $T_1$ is 100° to 175° C.

11. A device according to claim 1 wherein each of the crystalline polymers in the PTC composition is a fluorinated polymer.

12. A device according to claim 1 wherein the first crystalline polymer is polyvinylidene fluoride and the second crystalline polymer is an ethylene/tetrafluoroethylene copolymer.

13. A device according to claim 1 wherein said second polymeric composition has substantially greater flexibility than said PTC composition at all temperatures between 0° C. and 100° C.

14. A device according to claim 1 wherein said second polymeric composition has substantially greater flexibility than said PTC composition at all temperatures between 0° C. and the switching temperature of the composition.

* * * * *

UNITED STATES PATENT AND TRADEMARK OFFICE
CERTIFICATE OF CORRECTION

PATENT NO. : 4,400,614
DATED : August 23, 1983
INVENTOR(S) : Umesh K. Sopory

It is certified that error appears in the above-identified patent and that said Letters Patent is hereby corrected as shown below:

In Claim 1, line 7, after "melting point $T_1$ and" insert --a second crystalline polymer having--.

Signed and Sealed this

Nineteenth Day of July, 1988

Attest:

DONALD J. QUIGG

*Attesting Officer*    *Commissioner of Patents and Trademarks*